March 18, 1924.
J. J. BAMBACH
SHOCK ABSORBER
Filed Feb. 12, 1923    2 Sheets-Sheet 1
1,487,524
Fig. 1.
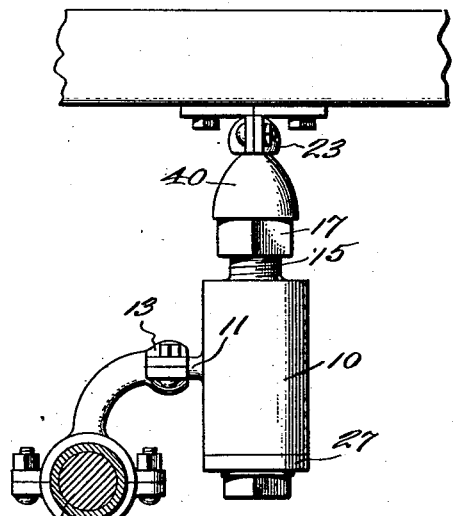
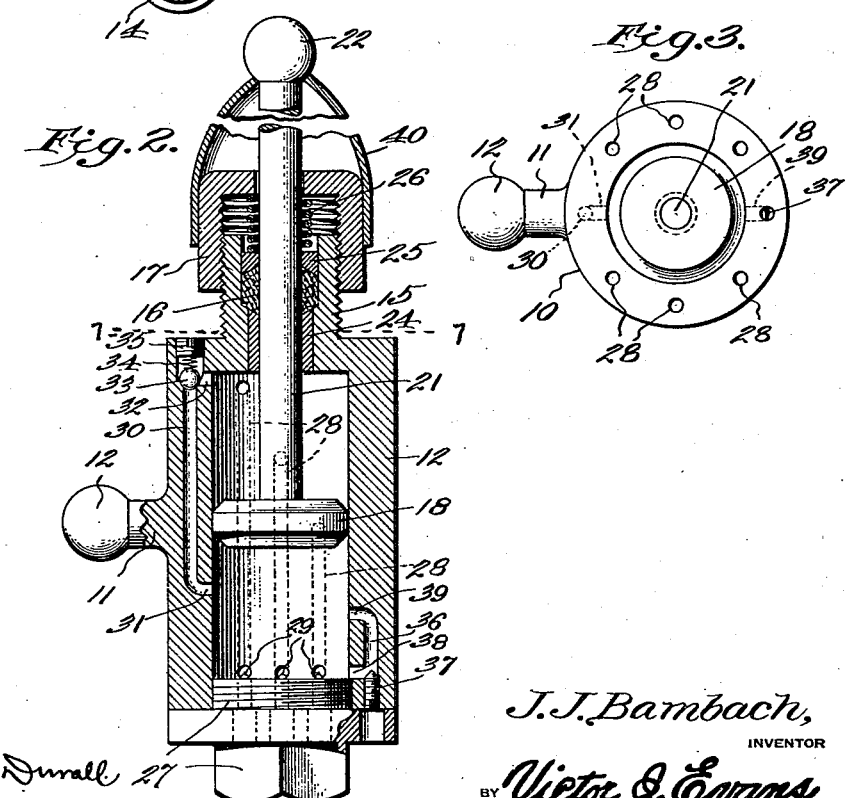
Fig. 2.
Fig. 3.
J. J. Bambach,
INVENTOR March 18, 1924.

J. J. BAMBACH

SHOCK ABSORBER

Filed Feb. 12, 1923

J. J. Bambach,
INVENTOR

BY Victor J. Evans
ATTORNEY

Patented Mar. 18, 1924.

1,487,524

UNITED STATES PATENT OFFICE.

JOHN J. BAMBACH, OF WILKES-BARRE, PENNSYLVANIA.

SHOCK ABSORBER.

Application filed February 12, 1923. Serial No. 618,649.

*To all whom it may concern:*

Be it known that I, JOHN J. BAMBACH, a citizen of the United States, residing at Wilkes-Barre, in the county of Luzerne and State of Pennsylvania, have invented new and useful Improvements in Shock Absorbers, of which the following is a specification.

This invention relates to shock absorbers for vehicles, and embodies amongst other features, a cylinder adapted to be supported by the axle of the vehicle, and in which cylinder operates a piston supported by the frame of the vehicle, the cylinder containing fluid in passages which allows the fluid to move from through the cylinder at opposite sides of the piston incident to the reciprocatory motion of the latter, with the fluid offering a resistance to the movement of the piston in a manner to prevent shocks and jars of the running gear being transmitted to the body of the vehicle.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 1 is a fragmentary view of a vehicle showing the manner of supporting the shock absorber forming the subject matter of the present invention.

Figure 2 is an enlarged fragmentary sectional view of the shock absorber.

Figure 3 is an end elevation with the plug removed from the cylinder.

Figure 4:
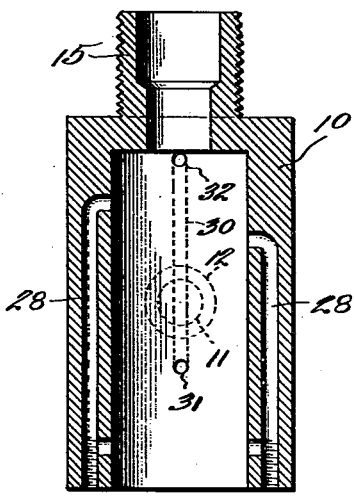
Figure 4 is an enlarged vertical sectional view through the cylinder.
Figure 5:
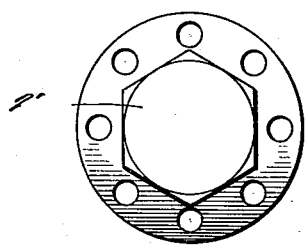
Figure 5 is a detail view of the plug used for closing the lower end of the cylinder.
Figure 6:
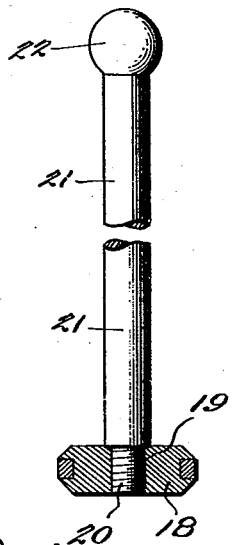
Figure 6 is a detail view of the piston and piston rod, the piston being shown in section.
Figure 7:
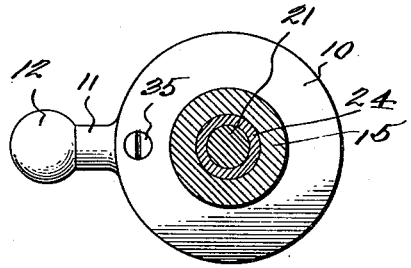
Figure 7 is a sectional view taken on the line 7—7 of Figure 2.

Referring to the drawings in detail, 10 indicates the cylinder of the device forming the subject matter of the invention, and projecting from one side of this cylinder at an appropriate point in its length is an extension 11 having a spherical end portion 12 which is adapted to accommodate itself to a socket 13 associated with the axle 14 of the vehicle. The cylinder is provided with a reduced upper end portion 15 which is hollow to receive packing of any suitable character indicated at 16, and this end of the cylinder is closed by a packing nut 17, which is threaded on the reduced extension 15. Operating within the cylinder is a piston 18 which is interiorly threaded as at 19 to accommodate the threads 20 on the lower end of the piston rod 21, the rod terminating to provide a spherical end portion 22 adapted to be fitted in a socket 23 carried by the frame of the vehicle. The piston rod 21 operates through a bushing 24 which is arranged in the reduced portion 15 of the cylinder, and also passes through the packing 16 as will be readily understood. Reposing upon the packing 16 and positioned within the reduced extension 15 is a packing gland 25, while interposed between the gland 25 and the packing nut 17 is a coiled spring 26. When the packing nut 17 is screwed down in position, the spring 26 is of course tensioned, and this automatically takes up any wear on the packing 16. The lower end of the cylinder 10 is closed by a plug 27 which is threaded into the lower end of the cylinder as shown. From the construction thus far described, it is apparent that incident to the relative movements of the running gear and body of the vehicle, the piston 18 and cylinder 10 are moved in opposite directions and in order to regulate the movements of the piston 18, with a view of absorbing the shocks and jars of the running gear incident to the travel of the machine over irregular surfaces, I provide the construction to be presently described.

In carrying this idea into effect, the cylinder 10 is provided with spaced bores or passages 28 which have their lower extremities arranged substantially in the same horizontal plane, while their upper extremities terminate different distances from the top of the cylinder as shown. Arranged in the lower end of the cylinder and each of these bores is an adjusting screw 29 which is pointed, and which can be adjusted to regulate the size of the openings of the bores 28, and in this manner control the resistance offered to the piston 18. In addition to the bores 28, the cylinder is provided with an additional bore 30 which opens into the upper end of the cylinder, and also into the cylinder at a slight distance below the transverse center thereof as indicated at 31, and this bore communicates with a transverse bore 32 arranged adjacent the upper end of the cylinder. The communication between the bore 30 and the bore 32 is controlled by a ball valve 33 which is normally held seated by means of a spring 34 arranged in the bore 30, one end of the spring bearing against a plug 35 which closes the adjacent end of this bore. The cylinder is further provided with a bore 36 which opens at the lower end of the cylinder but normally closed by means of the adjusting valve 37, the bore 36 communicating with a lateral bore 38 at a point immediately adjacent the bottom thereof. The bore 36 opens into the cylinder as at 39 at a point slightly beneath the adjacent end of the bore 31 for a purpose to be presently described. The cylinder is adapted to contain fluid which flows through the bores from one to the other side of the piston as the latter is reciprocated in a manner which offers resistance to the piston for the purpose of checking and cushioning the shocks and jars which would be otherwise transmitted to the running gear from the body of the vehicle.

The piston is arranged at the bottom of the cylinder after which the cylinder is partly filled with fluid, such as oil or glycerine, and the piston occupies a position in the center of the cylinder when the machine is at rest. When a car is in motion and running over uneven ground imparting reciprocatory motion to the piston as will be readily understood, this fluid is transferred from one side of the piston to the other for the purpose above mentioned. As the piston is moved downwardly in the cylinder, it forces the fluid from beneath the piston through the ports 28, 30, and 36, the ball valve 33 being forced from its seat to allow the fluid passing through the bore 30 to reenter the cylinder through the passage 32. After the piston passes the end 31 of the bore 30, it closes the bore 30, whereupon the valve 33 is reseated under the influence of the spring 34. When the end 31 of the bore 30 is closed, the piston is still spaced from the bottom of the cylinder, and as it continues to move toward the bottom, the oil being forced through a less number of bores offers greater resistance, and helps to check the downward movement of the piston for the purpose stated. The oil passing through these bores reenters the cylinder adjacent the top thereof, so that it is again utilized to retard the upward movement of the piston. When the piston is moved upwardly in the cylinder, the fluid is forced through the bores just mentioned and reenters the cylinders on the underside of the piston. As the piston passes the end 39 of the bore 36, it closes this bore, so that the liquid is forced through a less number of bores and in this manner offers greater resistance to the upward movement of the piston. By having the bores 28 terminate different distances from the top of the cylinder, the resistance offered to the movement of the piston is graduated. The device is very simple in construction and efficient in operation for the purpose intended.

The packing nut 17, and the exposed portion of the piston rod 21 are covered by a rubber sleeve 40, one end of which is secured to the packing nut which is reduced, secured to the piston rod. This protects the piston rod from dirt and other foreign matter. As the sleeve is of flexible material, it will readily act with the movements of the piston rod.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:

1. A shock absorber for vehicles comprising a fluid containing cylinder adapted to be secured to the axle, a piston operating therein and including a rod secured to the frame of the vehicle, said cylinder having longitudinal bores opening into the cylinder adjacent the ends thereof, whereby said fluid is transferred from one side of the piston to the other as the piston reciprocates, the corresponding lower extremities of certain of said bores lying substantially in the same plane, and the upper extremities of the latter mentioned bores being stepped from the top of the cylinder for the purpose specified.

2. A shock absorber for vehicles comprising a fluid containing cylinder adapted to be secured to the axle, a piston operating therein and including a rod secured to the frame of the vehicle, said cylinders having longitudinal bores opening into the cylinder adjacent the upper ends thereof, whereby said fluid is transferred from one side of the piston to the other as the piston reciprocates, the upper ends of said bores being spaced different distances from the top of the cylinder, and means for regulating the entrance of the fluid into the lower ends of said bores for the purpose specified.

3. A shock absorber for vehicles comprising a fluid containing cylinder secured to the axle, a piston operating in the cylinder and connected to the frame of the vehicle, said cylinder having bores opening into the cylinder adjacent the ends thereof, whereby said fluid is transferred from one side of the piston to the other as the piston is reciprocated, means for regulating the entrance of the fluid into the lower ends of the said bores to vary the resistance offered said piston as described, other bores opening into the cylinder adjacent the center thereof and adapted to be closed by the passing of the cylinder, one of the latter mentioned bores opening into the cylinder at spaced points, and a normally closed valve controlling the communication at one of said points.

In testimony whereof I affix my signature.

JOHN J. BAMBACH.